United States Patent Office 3,704,290
Patented Nov. 28, 1972

3,704,290
6-(1 - SUBSTITUTED AMINOCYCLOALKANE-CARBOXAMIDO)-PENICILLANIC ACID AND SALTS
Joseph P. Hou and John W. Poole, Montgomery, Pa., assignors to American Home Products Corporation, New York, N.Y.
No Drawing. Continuation-in-part of abandoned application Ser. No. 37,911, May 15, 1970. This application Dec. 9, 1970, Ser. No. 96,653
Int. Cl. C07d 99/16
U.S. Cl. 260—239.1                    7 Claims

ABSTRACT OF THE DISCLOSURE

Novel sulfonylated penicillins have been prepared which have antibacterial activity and are useful for the treatment of mastitis in cattle and for the treatment of infections caused by susceptible microorganisms.

---

This application is a continuation-in-part of Ser. No. 37,911, filed May 15, 1970, now abandoned.

DESCRIPTION OF THE INVENTION

The invention relates to the product of new and novel penicillins of Formula I.

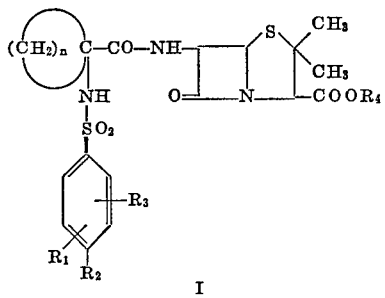

I wherein $R_1$, $R_2$ and $R_3$ are independently selected from the group consisting of hydrogen, (lower)alkyl, phenyl, benzyl, halogen, (lower)alkoxy and carboxyl; $n$ is an integer of from about 4 to about 7; $R_4$ is selected from the group consisting of sodium, potassium and hydrogen.

When used herein and in the appended claims, the term "(lower)alkyl" contemplates hydrocarbon radicals, straight and branched, of from about 1 to about 6 carbon atoms; illustrative members of the group being methyl, ethyl, n-propyl, i-propyl, n-butyl, t-butyl, n-pentyl, n-hexyl and the like. The term "(lower)alkoxy" contemplates hydrocarbonoxy groups of from 1 to about 6 carbon atoms, straight chain and branched, and includes methoxy, ethoxy, n-propoxy, i-propoxy, n-butoxy, t-butoxy, n-pentoxy, n-hexyloxy and the like.

By the term "halo" is meant to include chloro, fluoro, bromo and iodo.

The compounds of the invention are prepared by the following reaction scheme:

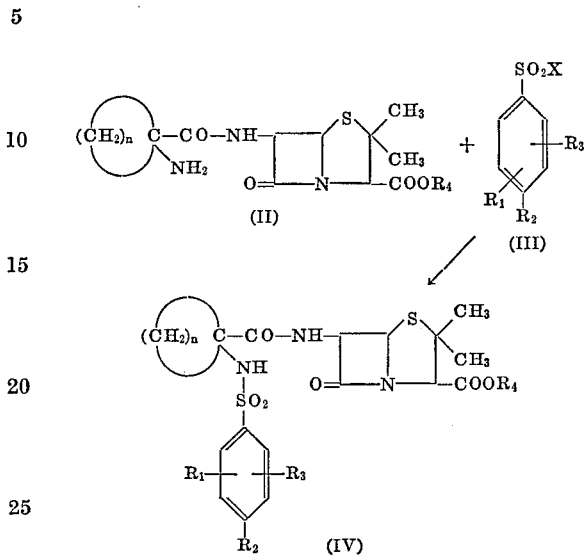

wherein $R_1$, $R_2$, $R_3$, $R_4$ and $n$ are the same as hereinabove described and X is halogen.

The reaction is performed by admixing approximately equal molar amounts of the reactants in an aqueous-acetone, dioxane or tetrahydrofuran solvent medium. The preferred solvent medium is a 50% aqueous tetrahydrofuran solvent mixture to which is added a suitable acid-acceptor, such as disodium phosphate, sodium phosphate, sodium or potassium carbonate, sodium bicarbonate or the like. The preferred acid- acceptor is sodium bicarbonate which is employed at a ratio of one to five moles of acid-acceptor, preferably at a range of three to four moles of acid-acceptor, at a constant pH range of from 7 to 8 and at a temperature range of about −20° C. to about 30° C. The preferred temperature range is from about −5° C. to about 0° C. Usually the reaction mixture is rapidly agitated for a period of from 1 to 5 hours for optimum results.

The free acid form of the compounds of the invention are extracted with an organic solvent such as ethyl acetate, isobutyl methyl ketone, diethyl ketone, but preferably ethyl acetate. Prior to extracting the product the reaction mixture is washed with ether and acidified to pH 2 with an acid such as dilute hydrochloric acid, dilute sulfuric acid, acetic acid etc. The organic extract is washed with cold water and dried with anhydrous sodium sulfate and concentrated at reduced pressure and temperature.

The cationic salt form of the compounds of the invention are prepared by adding an appropriate base such as sodium 2-ethylhexanoate, potassium 2-ethylhexanoate in butanol to the concentrated organic extract in a nonpolar solvent such as ether, hexane, heptane or the like. The amine salts may also be prepared by analogous methods.

The compounds of the invention have antibacterial activity and inhibit *Staphylococcus aureus*, Smith at a concentration of less than 10 micrograms/ml. of aqueous solution. They may be used for the treatment of bovine mastitis, growth promotors for animals and for the treatment of infections amenable to theraupy with penicillin G.

The compounds of the invention also possess substantial resistance to enzymatic degradation by penicillinase. This has been demonstrated by studies which have employed penicillinase derived from *St. aureus* Tex-2 and *B. cereus*.

The following examples are added to illustrate but not to limit the scope of the invention.

DESCRIPTION OF THE PREFERRED EMBODIMENTS

EXAMPLE I

6-[1-(benzenesulfonamido)cyclohexanecarboxamido] penicillanic acid, potassium salt Benzenesulfonylchloride (9.7 g.) in 300 ml. acetone was added slowly from a separatory funnel to a cold ($<5°$ C.) well-stirred solution of potassium cyclacillin (21 g.) in 500 ml. water and 200 ml. acetone in which sodium bicarbonate (10 g.) had previously dissolved. The reaction was allowed to proceed for about 3 hours. The reaction mixture is acidified with dilute hydrochloric acid to pH 2. The reaction mixture is then extracted with ethylacetate and the extract is washed with cold water and dehydrated with anhydrous sodium sulfate. The extract is concentrated at reduced temperature and pressure. Ether is added and a solution potassium 2-ethylhexanoate in butanol is added until no further crystalline precipitate forms. The mixture is filtered and washed with cold ether and redissolved in water and lyophilized to yield the title product. Yield, 15 g. (60%), M.P. 187–9° C. (dec.).

*Analysis.*—Calcd. for $C_{21}H_{26}N_3O_6S_2K$ (percent): C, 48.5; H, 5.0; N, 8.1. Found (percent): C, 48.4; H, 5.9; N, 7.8.

EXAMPLE II

6-[1-(2-mesitylenesulfonamido)cyclohexanecarboxamido]penicillanic acid, potassium salt 2-mesitylenesulfonylchloride (12 g.) was dissolved in 300 ml. acetone and added slowly to cyclacillin (17.5 g.) in 300 ml. water, 200 ml. acetone and 200 ml. (0.2 M $Na_3PO_4$—$Na_2HPO_4$, Buffer) in a cold and well-stirred reaction vessel. The reaction was conducted according to the procedure given in Example I. Yield, 8 g. (28%), M.P. 193–6° C. (dec.).

*Analysis.*—Calcd. for $C_{24}H_{32}N_3O_6S_2K$ (percent): C, 51.32; H, 5.74; N, 7.50; S, 11.42. Found (percent): C, 54.32; H, 6.27; N, 9.13; S, 12.24.

EXAMPLE III

6-[1-(p-toluenesulfonamido)cyclohexanecarboxamido] penicillanic acid, potassium salt p-Toluenesulfonylchloride (purified from acetone) (0.05 mole) in 250 ml. acetone added slowly to a cold and well-stirred solution of cyclacillin (0.05 mole) in 300 ml. acetone, 300 ml. water and 200 ml. 0.2 M $$Na_2HPO_4\text{—}Na_3PO_4$$

Buffer (pH 8–9). The reaction was carried out according to Example I. Yield, 10 g. (38%).

*Analysis.*—Calcd. for $C_{22}H_{28}N_3O_6S_2K$ (percent): C, 49.5; H, 5.29; N, 7.8. Found (percent): C, 42.6; H, 5.2; N, 6.6.

EXAMPLE IV

6-[1-(p-bromobenzesulfonamido)cyclohexanecarboxamido]penicillanic acid, potassium salt p-Bromobenzenesulfonylchloride (0.05 mole) in 300 ml. acetone was added to a well-stirred and cold solution of cyclacillin (0.05 mole) in 300 ml. acetone, 200 ml. 0.2 M $Na_2HPO_4$—$Na_3PO_4$, Buffer (pH 8–9), and the reaction was carried out according to Example I. Yield, 12 gm. (40%), M.P. 190.3° C. (dec.).

*Analysis.*—Calcd. for $C_{21}H_{25}N_3O_6S_2KBr$ (percent): C, 42.14; H, 4.21; N, 7.02. Found (percent): C, 44.8; H, 5.01; N, 8.12.

EXAMPLE V

6-[1-(p-chlorobenzenesulfonamido)cyclohexanecarboxamido]penicillanic acid, potassium salt p-Chlorobenzenesulfonylchloride (0.05 mole) in 300 ml. acetone was added slowly to a solution of cyclacillin (0.05 mole) in 300 ml. acetone, 200 ml. 0.2 M $$Na_2HPO_4\text{—}Na_3PO_4$$

Buffer (pH 8–9), and the reaction was carried out according to Example I. Yield, 9 g. (31%), M.P. 205–7° C. (dec.).

*Analysis.*—Calcd. for $C_{21}H_{25}N_3O_6S_2KCl$ (percent): C, 45.53; H, 4.55; N, 7.60. Found (percent): C, 45.0; H, 5.0; N, 8.47.

EXAMPLE VI

6-[1-(p-fluorobenbenesulfonamido)cyclohexanecarboxamido]-penicillanic acid, potassium salt p-Fluorobenzenesulfonylchloride (9.73 g.) in 200 ml. acetone was added slowly from a separatory funnel to a cold ($<5°$ C.) well-stirred solution of potassium cyclacillin (20.9 g.) in 500 ml. water and 300 ml. acetone in which sodium bicarbonate (10 g.) had previously been dissolved. The reaction was allowed to proceed for about 3 hours. The reaction mixture was treated as described in Example I. Finally, the potassium salt was obtained through lyophilization. Yield 6 gm. (6%), M.P. 165–7° C. (dec.).

*Analysis.*—Calcd. for $C_{21}H_{25}N_3O_6S_2FK$ (percent): C, 46.9; H, 4.7; N, 7.8. Found (percent): C, 49.2; H, 6.1; N, 7.3.

EXAMPLE VII

By procedures analogous to those employed above, the following compounds are prepared:

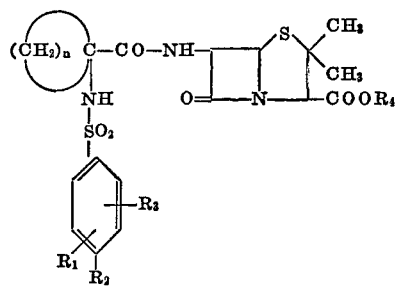

| n | R₁ | R₂ | R₃ | R₄ |
|---|---|---|---|---|
| 6 | Hydrogen | 4-chloro | Hydrogen | Na |
| 6 | 3-chloro | do | do | K |
| 6 | Hydrogen | 4-bromo | do | K |
| 4 | 3-methoxy | 4-methoxy | do | H |
| 5 | Hydrogen | 4-fluoro | do | K |
| 5 | do | 4-ethyl | 5-ethyl | K |
| 6 | do | 4-phenyl | Hydrogen | K |
| 6 | do | 4-benzyl | do | Na |
| 7 | do | 4-carboxy | do | H |
| 6 | do | 4-n-propyl | do | H |
| 5 | 3-methoxy | 4-methoxy | 5-methoxy | Na |
| 6 | Hydrogen | 4-ethoxy | Hydrogen | K |
| 6 | 3-propoxy | Hydrogen | do | K |
| 4 | Hydrogen | 4-n-butyl | do | H |
| 7 | 3-methyl | 4-methyl | 5-methyl | K |

We claim:
1. A compound selected from the group consisting of

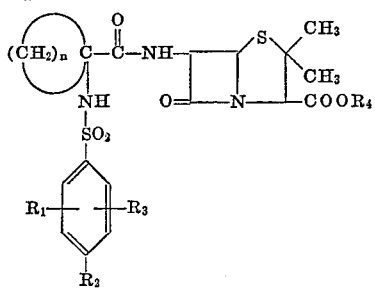

wherein $R_1$, $R_2$ and $R_3$ are independently selected from the group consisting of hydrogen, (lower)alkyl, phenyl, benzyl, halogen, (lower)alkoxy and carboxyl; $n$ is an integer of from about 4 to about 7; $R_4$ is selected from the group consisting of sodium, potassium and hydrogen.

2. A compound as defined in claim 1 which is: 6-[1-(benzenesulfonamido) cyclohexanecarboxamido] penicillanic acid, potassium salt.

3. A compound as defined in claim 1 which is: [1-(2-mesitylenesulonamido) cyclohexanecarboxamido] penicillanic acid, potassium salt.

4. A compound as defined in claim 1 which is: 6-[1-(p-toluenesulfonamido)cyclohexanecarboxamido]penicillanic acid, potassium salt.

5. A compound as defined in claim 1 which is: 6-[1 - (p - bromobeneznesulfonamidocyclohexanecarboxamido]penicillanic acid, pottasium salt.

6. A compound as defined in claim 1 which is: 6-[1 - (p - chlorobenzenesulfonamido)cyclohexanecarboxamido]penicillanic acid, potassium salt.

7. A compound as defined in claim 1 which is: 6-[1 - (p - fluorobenzenesulfonamido)cyclohexanecarboxamido]penicillanic acid, potassium salt.

References Cited
UNITED STATES PATENTS
3,538,083   11/1970   Grant et al. _____ 260—239.1

NICHOLAS S. RIZZO, Primary Examiner

U.S. Cl. X.R.
424—271